United States Patent [19]

Wemhoff

[11] Patent Number: 4,735,728
[45] Date of Patent: Apr. 5, 1988

[54] METHOD FOR POLLUTION CONTROL IN PHOTOGRAPHIC PROCESSING

[75] Inventor: Mark F. Wemhoff, Enterprise, Fla.

[73] Assignee: Environmental Tech America, Inc., Sanford, Fla.

[21] Appl. No.: 935,770

[22] Filed: Nov. 28, 1986

Related U.S. Application Data

[63] Continuation-in-part of Ser. No. 770,609, Aug. 29, 1985, Pat. No. 4,640,769.

[51] Int. Cl.$^4$ .......................... C02F 1/32; C02F 1/04
[52] U.S. Cl. ................................... 210/668; 210/669;
210/673; 210/748; 210/760; 210/774;
203/DIG. 5; 203/31; 203/41; 159/47.3
[58] Field of Search ................ 430/398, 399; 210/192,
210/180, 774, 748, 694, 760, 668, 669, 673, 181,
175, 912; 203/31, 41, DIG. 5; 159/47.3

[56] References Cited

U.S. PATENT DOCUMENTS

| 3,127,243 | 3/1964 | Konikoff | 203/DIG. 5 |
| 4,012,321 | 3/1977 | Koubek | 210/748 |
| 4,044,696 | 8/1977 | Marincek | 210/774 |
| 4,219,415 | 8/1980 | Nassef et al. | 210/184 |
| 4,518,503 | 5/1985 | Fermaglich | 210/694 |
| 4,654,144 | 3/1987 | Sharkey et al. | 210/760 |

FOREIGN PATENT DOCUMENTS 53-49857  5/1978  Japan ................................... 210/748

Primary Examiner—Benoit Castel
Attorney, Agent, or Firm—Robert M. Skolnik

[57] ABSTRACT

A combination of pollution control technologies are employed in the treatment of effluent from photographic processing. The technologies employed are evaporation, oxidation by photolysis and catalyzed ozone, condensation, treatment by activated carbon and electrolysis. The method includes the steps of filtering the liquid wastes, electrolytically treating the filtered liquid, evaporating the wastes to create steam and vapors, oxidizing the steam and vapors by photolysis and photolytic catalyzed ozone, and condensing the vapors and passing them through a column of activated carbon. The carbon is regenerated by oxidizing the carbon sites with ozone.

5 Claims, 4 Drawing Sheets

METHOD FOR POLLUTION CONTROL IN PHOTOGRAPHIC PROCESSING

CROSS-REFERENCE TO RELATED APPLICATIONS

This Application is a continuation-in-part of copending application Ser. No. 770,609, filed Aug. 29, 1985 now U.S. Pat. No. 4,640,769.

FIELD OF THE INVENTION

This invention relates to a method for pollution abatement in the removal of metals and reduction of biological and chemical oxygen demand (BOD/COD), to resource recovery in the recovery of metals, and specifically, to such removal, reduction, and recovery in the effluent of washless photographic processing, by means of combined evaporation, photolysis, photo-oxidation, and activated carbon adsorption. The method involves the application of a combination of technologies for treatment of hazardous and nonhazardous liquid wastes.

SUMMARY OF THE INVENTION

The first step in the process is an evaporation stage where solutions are heated to 212 degrees Fahrenheit. The resulting steam and vapors are then oxidized by photolysis and photolytic catalyzed ozone before they are condensed. The steam and vapors are then condensed and the condensate is passed through a column of activated carbon. The activated carbon absorbs any unoxidized COD species and aids in the control of any odors which may be emitted in the evaporation stage. The final step is regeneration of the activated carbon by oxidizing the absorbed COD species on the active carbon sites with ozone. This process is implemented in an apparatus designed to treat all photochemistries but specifically suitable for use in the treatment of washless photo chemistries. The apparatus is comprised of two main units, a lower sump unit and an upper evaporation unit.

The sump is manually filled through a port located in the top of the sump unit. The sump is a stainless steel cube with a liquid capacity of 51 liters (13.5 gallons). The operator will then switch the main power switch to "ON" and activate the system. This includes activation of an ultraviolet lamp and an air pump located in the evaporator portion of the apparatus. A sump float is now in a "NOT" empty position and an evaporator float switch in the evaporator portion is at its empty position. In this situation, an electric solenoid pinch valve is open and a submersible sump pump located on the bottom of the sump is activated.

The pinch valve is timed by means of a solid state variable resistor timer to remain open for five minutes. This pinch valve is located between the sump and the evaporator units and makes a direct connection between the two units. Attached to the sump discharge end of the pinch valve is a filter system which traps the sludge generated in the evaporator so it can be sent to a refiner for reclamation of any silver in the sludge. In the preferred embodiment, the filter system is V-shaped, 18 gauge ¼" expanded steel fitted with 25 micron disposable filter paper.

In the preferred embodiment, the sump pump is a 1/150 HP submersible pump capable of delivering 60 gallons per hour of liquid at a 6 foot head. This sump pump is connected to the evaporator by a ¼" NYLON tube. For the first five minutes that the pinch valve is open, the sump pump recirculates the liquid through the evaporator in a self-cleaning mode, depositing the solids into the filter system.

After the five minute period, the pinch valve closes and the sump pump fills the evaporator. The evaporator is an insulated stainless steel cube with a maximum liquid volume of 2 gallons. Thus, a 327 cubic inch air space is left in the evaporator and an ultraviolet lamp assembly is located in this space for steam and vapor reactions. The sump pump continues to fill the evaporator until the evaporator float reaches its "high" level. At the high level, a float switch deactivates the sump pump and a separate independent float switch energizes the condenser fan and a 1000 watt imersion heating coil. This independent switching allows the heating coil and the condenser fan to remain ON as long as there is liquid in the sump and allows the sump pump to keep the liquid level in the evaporator full this minimizing solution heat loss.

The solution is brought up to 212 degrees F. and as the steam and vapors are generated, they are oxidized in the reaction space in the evaporator by interaction with the ultraviolet light and ozone. In the preferred embodiment, the ultraviolet lamp is a 17 centimeter (cm) by 0.65 cm low pressure mercury lamp with emissions from 185 to 579 nanometers (nm). The lamp has a radiation intensity of 17±5 microwatts/square centimeter. The lamp may be encased in a 7" by ½" O.D. thin walled TEFLON tube and mounted through the evaporator wall by means of a 3-way gland fitting. The gland fitting provides a light tight seal and allows the introduction of air into the evaporator. The air is supplied by a 1,300 cubic centimeters/minute air pump. The air is then pumped through the space between the UV lamp and the TEFLON housing tube allowing the generation of ozone and supporting a positive pressure (4 psi) inside the evaporator. Ozone is generated according to $O_2$—UV—$O_3$. The TEFLON tube is transparent to ultraviolet radiation and floods the evaporator with light.

The combination of ozone and ultraviolet light provides direct catalytic oxidation of the vapors as they are generated. In addition, the positive air pressure in the evaporator aids in the transport of the steam and vapors through the condenser coil and the transport of the condensate through the column of activated carbon. The vapors and steam are condensed in a fan cooled, stainless steel, finned, condenser coil. The coil and fan configuration yield a BTU removal rate of 3,413 BTU's per hour. The condensate is then passed through the 50 cubic inch activated carbon tube to remove unoxidized vapors and neutralize the odor.

The process continues as long as the sump float switch does not indicate "low" level. Once the evaporator float switch reaches the "empty" position, the ⅜ inch pinch valve opens for 5 minutes and the sump pump starts pumping liquid from the sump into the evaporator. This action flushes the sludge from the evaporator into the filter located in the sump. The pinch valve then closes and the evaporator is filled and the cycle starts over again. Once the sump float switch indicates "empty" and the evaporator float switch indicates "empty", the heating element, condenser fan, and sump pump are all deactiviated. The ultraviolet lamp and air pump remain ON generating and forcing ozone through the activated carbon tube. The ozone can then oxidize the absorbed COD constituents on the active carbon sites thus regenerating the carbon for the next run.

Heretofore, evaporation, photolysis, photo-oxidation, and activated carbon adsorption have each been employed as unit operations in pollution abatement and resource recovery. No combination of such unit operations had heretofore been developed which was capable of providing suitable pollution abatement and resource recovery in the effluent of washless-type photographic processing chemistry. This effluent typically consists of spent processing chemicals and rinse waters which contain certain metals and volatile organic compounds, the discharge of which is unlawful under title 33, Section 1311, paragraph A of the U.S. Code, and other Federal, state, and local environmental regulations.

Methods now in use recover metals from conventional photographic processing effluent by metallic replacement, reverse osmosis, ion exchange, chemical precipitation, electrowinning, evaporation, and other techniques. However, these methods are also not capable of reducing the biological and chemical oxygen demand (BOD/COD) caused by certain volatile organic compounds which are present in several new types of processing chemistry.

In addition, the aforesaid new types of chemistry have been developed for automated processing equipment which is intended for use in small "one-hour" photo-processing outlets which are typically located in areas of concentrated retail business activity and operated by proprietors with limited capital resources. For these reasons, legal limitations on the discharge of volatile organic compounds are strictly enforced, and waste generators are often unable to afford the elaborate and expensive apparatus required to reduce their pollutants. As a result, many proprietors are unable to obtain permits to discharge their wastes into sewers and/or publicly owned treatment works.

Further disadvantages, particular to each field, industry, process or type of effluent to which pollution abatement and resource recovery by the combination of evaporation, photolysis, photo-oxidation, and activated carbon adsorption might apply, also render the methods now in use impractical, for reasons which relate to the primary disadvantages outlined above.

Accordingly, several objects of my invention are as follows:

Effective metals removal—The invention removes heavy metals to levels which enable the waste generator to discharge process effluent in compliance with environmental regulations.

Effective metals recovery—The invention recovers metals at an efficiency and in such form as to render them economically beneficial to the waste generator.

Reduction of volatile organic compounds—The invention reduces volatile organic compounds in the effluent to levels which enable the waste generator to discharge process effluent in compliance with environmental regulations.

Compact size—The apparatus of the invention has dimensions which are uniquely suitable for operations which generate washless-type photographic processing effluent.

Skill requirement—The simplicity and semi-automatic operation of the invention is uniquely suitable for operations which generate washless-type photographic processing effluent.

A further modification of the system has been found desirable resulting in a reduction of distillate pH and an increase in the useful life of the apparatus. Specifically, an electrolytic subsystem may be added to the unit comprised of a carbon rod anode which is ¾" in diameter by 12" long. This anode is insulated at both ends with a PVC cap fitting. The cathode electrode surface is the entire interior of the sump. The electrolytic subsystem is powered by a 3 volt D.C., ½ wave power supply and is only activated when the sump pump is energized.

It is general knowledge that oxidation occurs at the anode and reduction will occur at the cathode. The use of the electrolytic subsystem in the apparatus has two purposes;

1. to aid in the oxidation of thiosulfates and other species prior to evaporation; and
2. to convert the soluble metallic species (silver, iron, etc.) to the insoluble metal.

The effects of these two purposes have reduced the distillate pH from 9.5 to 8.8, lessened the corrosive pitting in the boiler and sump, and decreased the salt build-up in the sump and in the evaporator.

A further object of my invention is the provision of a pollution control method which can be employed in the local offices of the user and processor of photographic film. Another object of my invention is the provision of a device which can process sludge for reclamation. A still further object of the invention is the provision of ozone treatment for both the effluent and the final stage activated carbon filter to regenerate the filter for subsequent use. An important object of the invention is the provision of a method which employs a number of different treatment operations in a single system.

BRIEF DESCRIPTION OF THE DRAWINGS

These as well as further object and advantages of the invention will become apparent to those skilled in the art from a review of the accompanying detailed specification, reference being made to the accompanying drawings in which.

DESCRIPTION OF THE PREFERRED EMBODIMENTS

Figure 1:
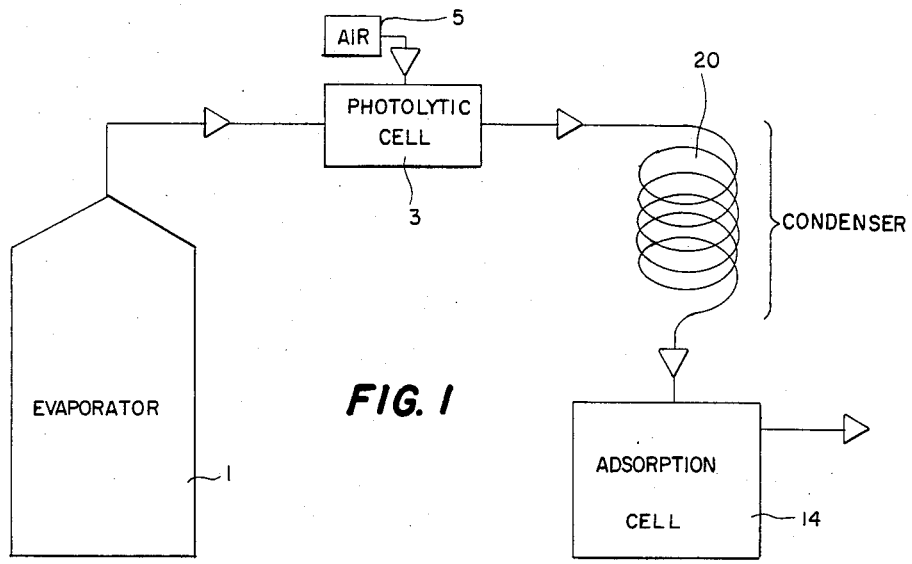
FIG. 1 is a block diagram of the system according to the invention.
Figure 3:
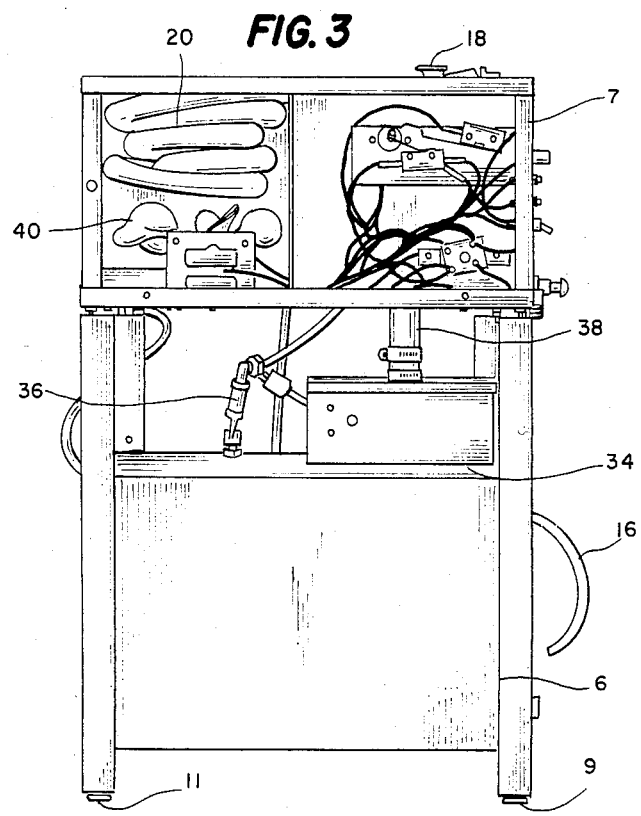
FIG. 3 is a front view of the apparatus.

FIG. 1 is a schematic diagram of the system for removal of metals and reduction of biological and chemical oxygen demand (BOD/COD) in accordance with the present invention. The system is used in washless photographic processing chemistry and employs evaporation, photolysis, photo-oxidation, and activated carbon adsorption. The system includes a plurality of components including an insulated enclosure, an evaporator, a photlytic cell, a condenser, an activated carbon adsorption cell, and a control means.

The system includes an evaporator 1 consisting of a vessel which is heated by electrical resistance. Processing effluent is introduced into the vessel, and heated causing water and volatile organic compounds to be expressed as vapor. Solids and complexed ionic metals remain in the vessel, contained in a temperature-resistant liner, which can be removed for disposal when a sufficient quantity of solids have accumulated.

From the evaporator 1, vapor passes into a cell 3 in which short-wave ultraviolet radiation produces a photolytic reaction, reducing the volatile organic compounds and other sources of biological/chemical oxygen demand (BOD/COD). Compressed air 5 is also introduced at the photolytic cell, in order to stimulate the production of ozone which further enhances in reduction of BOD/COD.

From the photolytic cell 3, vapor passes into a condenser 30 which further enhances the reduction of BOD/COD, and causes the improved effluent to return to a liquid state. Preferably, the photolytic cell includes a short-wave ultraviolet radiation source, a source of positive air pressure.

From the condenser 30, the condensate passes into an activated carbon adsorption cell 14, which further enhances the reduction of BOD/COD. The activated carbon adsorption cell also incorporates an aeration device, which extends the useful life of the activated carbon media. Preferably, the activated carbon adsorption cell consists of a matrix of baffles which cause liquid to be forced along an extended path through the activated carbon media, and an aeration device for extending the life of the activated carbon media. From the activated carbon adsorption cell 14, filtered effluent exits the system.

The system of the present invention includes a control means which is responsive to the progress and completion of each sequential batch of processed effluent. Once the operator supplies a batch of effluent for processing and activates the system, processing is automatic and the system will shut down at completion.

Integral to the functioning of the system is the insulated enclosure, which conserves heat in that portion of the system occupied by the evaporator, and facilitates cooling in that portion occupied by the photolytic cell and condenser. Access to the enclosure permits removal of accumulated solids from the evaporator, and maintenance of the activated carbon adsorption cell.

Figure 2:
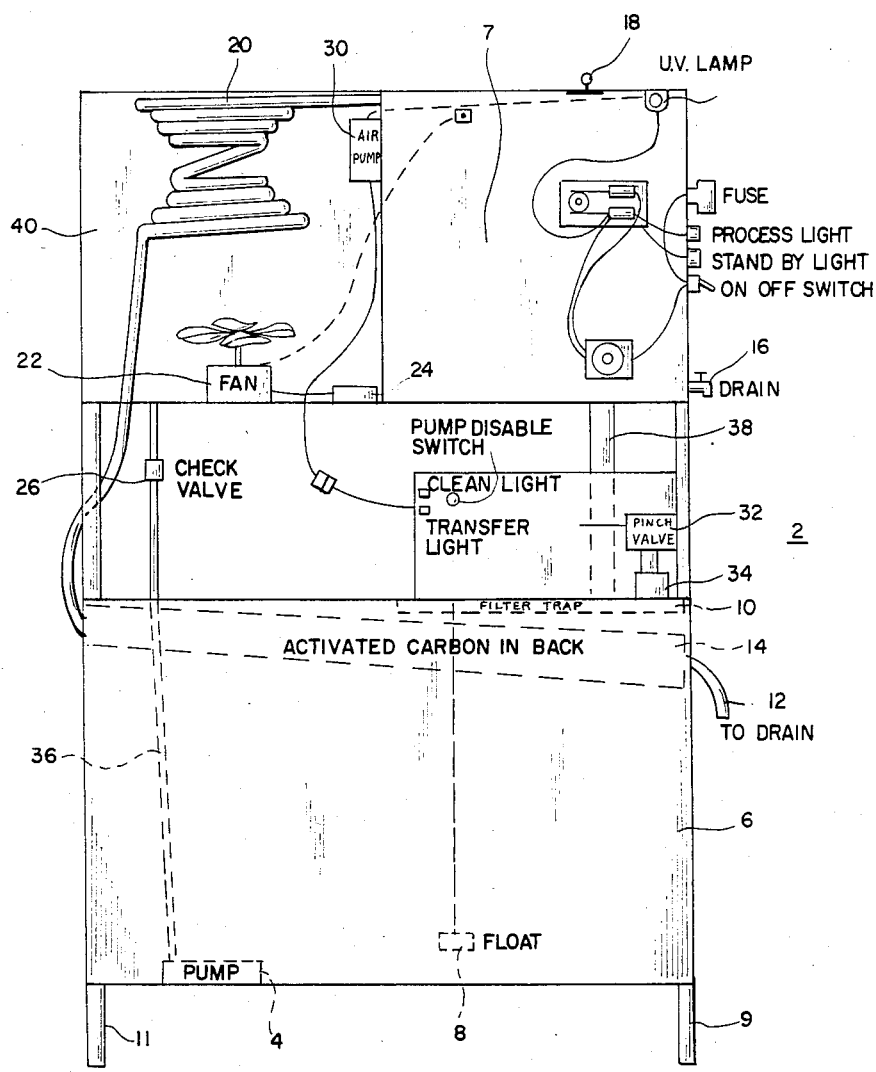
FIG. 2 is a diagrammatic view of the apparatus.
Figure 4:
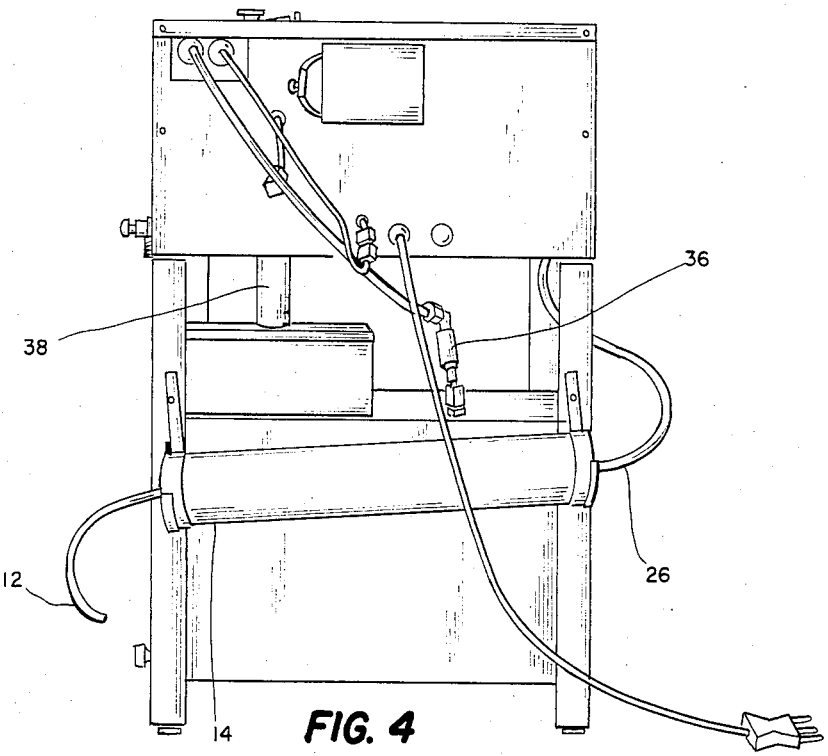
FIG. 4 is a back view of the apparatus.

FIG. 2 is a more detailed view of the apparatus of the invention. In FIG. 2, a sump 6 is shown which can be manually filled through a port 34. The port is located at the top of the sump portion of the unit.

As shown in FIG. 2, sump 6 contains a sump float detector 8 and a sump pump 4. The pump 4 is connected to an evaporator portion of the apparatus 7. This evaporator portion serves as a boiler and receives the contents of sump 6 via the tubing connection 36. A check valve 26 is provided in the tubing line 36 to control the flow of liquid in tubing line 36. The output of tubing line 36 is connected into evaporator 7.

A path directly from evaporator 7 into the sump 6 is also provided via tubing connection 38, pinch valve 32 and filter trap 10. When pinch valve 32 is OPEN, the contents of evaporator 7 are permitted to flow into the sump 6 via the filter trap 10.

The evaporator 7 contains a UV source 28 (FIG. 6) and a heating coil and float detector (both not shown). The boiler/evaporator 7 is fluidly coupled to condenser coil 20 which is located in the condenser portion 40 of the device. Condenser portion 40 also contains an air pump 30, a fan 22 and a power supply, 24 for the UV lamp 28. As previously explained, vapors from the evaporator section 7 are conveyed into condenser coil 20. The output of the condenser coil 20 is further filtered in an activated carbon tubular filter 14 and then fed to the system drain, 12. The entire device is mounted on legs 9 and 11 which may form part of the main structural support for the apparatus.

Figure 5:
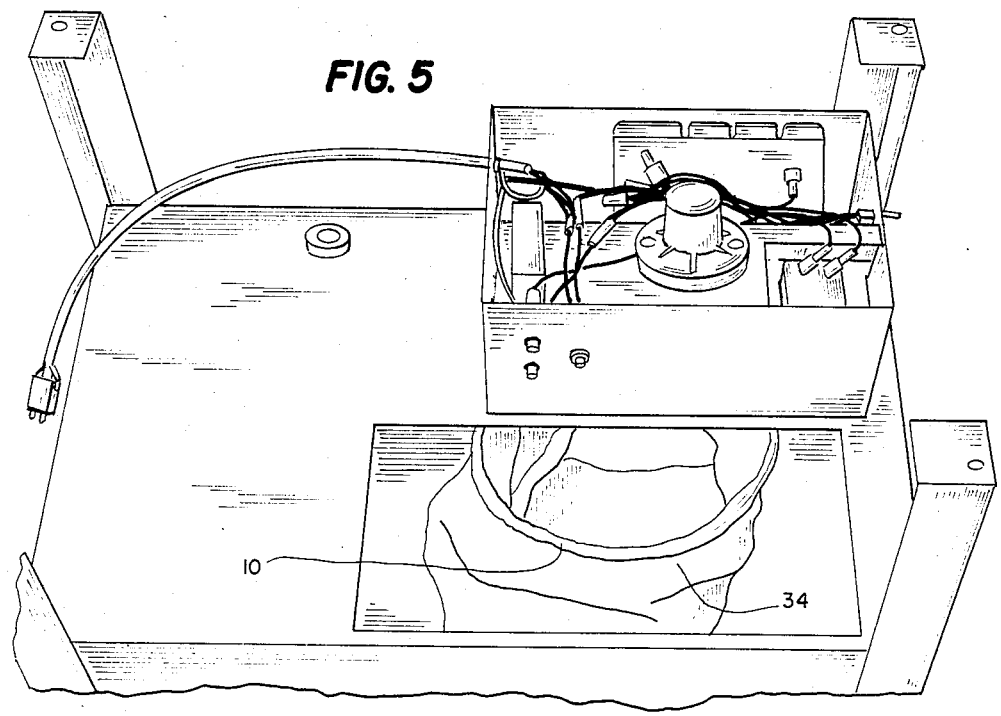
FIG. 5 is a view of the sump and filter portion of the apparatus.

As previously described, sump 6 is filled manually via the port 34 (best shown in FIG. 5). As diagramatically shown in FIG. 2, sump 6 has the pump 4 and float 8 mounted therein. When the main switch is activated, the UV lamp 28 and the air pump 30 are also activated. Sump float 8 is thus detecting a fluid level in the sump and pinch valve 32 is caused to remain open thus permitting fluid to be pumped from the sump 6 via the tubing 36 into evaporator 7 and, via tubing 38, valve 32 and filter 10, back into sump 6. As best shown in FIG. 5, the filter 10 is formed to trap sludge for subsequent disposal or reclamation.

After completion of this timed sludge removal cycle, the pinch valve 32 is closed and the sump pump 4 fills the evaporator 7. A float switch in evaporator 7 detects "full" and causes the sump pump 8 to deactivate, and fan 22 and the evaporator heating element to activate. In this manner, the heating coil and the fan are both ON and the sump pump 4 will continue to keep the liquid level in evaporator 7 constant so long as sump float 8 is not indicating that the sump 6 is empty.

Figure 6:
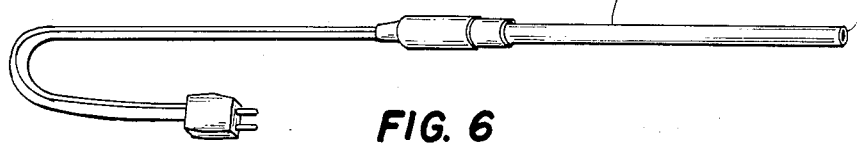
FIG. 6 is a perspective view of a portion of the apparatus.

Vapors generated in evaporator 7 are subjected to treatment from UV light and from ozone. As shown in FIG. 6, the UV lamp 28 is encased in a TEFLON tube housing 29, and is mounted in the wall of evaporator 7 via a gland fitting. As discussed in connection with FIG. 2, air is supplied via the air pump 30 into the space between the UV lamp 28 and the housing tube 29. A positive air pressure is also generated in the evaporator section 7 via pump 30. This positive air pressure aids in the transport of the steam and vapors through the fan cooled condenser coil 20 in condenser section 40.

The activated carbon filter 14 connected to receive the condensate from condenser section 40 is regenerated in that ozone is permitted to be applied to the filter for a period of time after the evaporator is empty. As previously discussed, this application of ozone cleanses the carbon filter for the next run.

Figure 7:
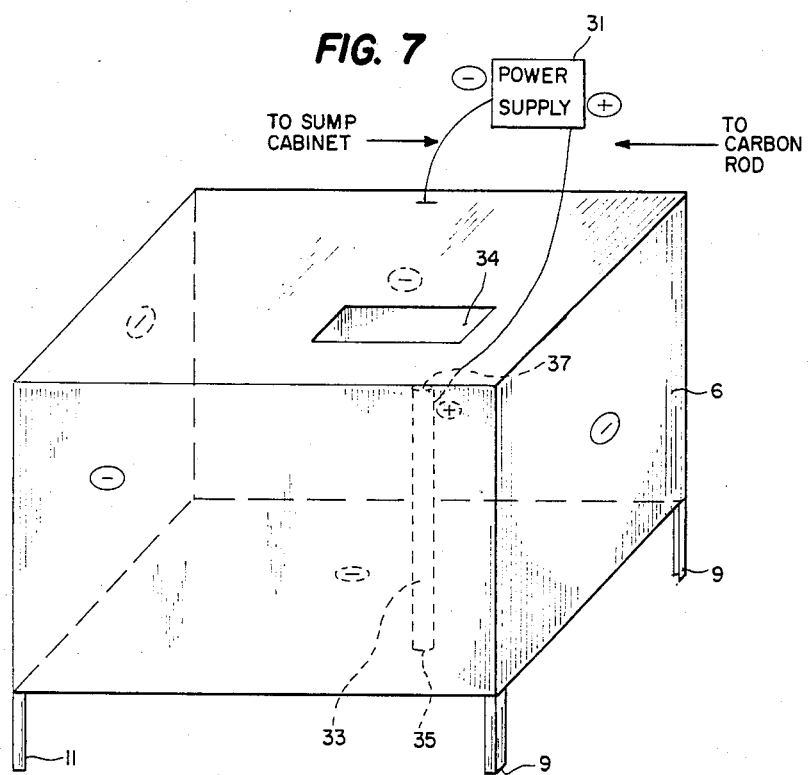
FIG. 7 is a diagrammatic view of the sump portion containing the electrolytic subsystem.

FIG. 7 shows a portion of FIG. 2 modified to incorporate the electrolytic subsystem for enhanced oxidation. FIG. 7 shows sump 6 having legs 9 and 11 thereon and having the port 34 formed in the top surface thereof for permitting the fluid to be poured into the sump. These parts were discussed in connection with the description of FIG. 2, above. The modification involves the mounting of electrode 33 in the sump 6. Electrode 33 is formed of a carbon rod with two PVC end caps 35 and 37 thereon. A power supply 31 has its positive output connected to the carbon rod 33 and its negative terminal connected to the sump itself. Thus, the entire interior surface of the sump serves as the cathode while the rod serves as the anode. The electrolytic system is powered by the supply 31 which may be a 3 volt D.C., ½ wave power supply which is only activated when the sump pump 4 is activated.

The electrolytic subsystem operates on the fact that oxidation occurs at the anode and reduction occurs at the cathode. The subsystem aids in the oxidation of thiosulfates and other species prior to evaporation and converts the soluble metallic species (silver, iron, etc.) to the insoluble metal. The subsystem has had the effect of reducing the distillate pH from 9.5 to 8.8 and has lessened the corrosive pitting in the boiler and the sump as well as decreased the salt buildup in the sump and in the evaporator.

Tests conducted with the apparatus show its effectiveness. The following test results were based on a before and after processing of Treated Washless Effluent. The sample was analyzed for the requested constituents before and after treatment with the apparatus of the invention.

| Test Paramenters | Quantity Values | |
|---|---|---|
| | Before | After |
| COD, mg/l | 48,700 | 550 |
| BOD, 5 Day @ 20° C., mg/l | | 12.4 |
| Suspended Solids, mg/l | 58 | 144 |
| pH, Units | 8.7 | 9.9 |
| Total Solids mg/l | 154,712 | 591 |
| Ammonia, mg/l | 15,768 | 2200 |
| Sulfide, Dissolved, mg/l | 0.10* | 0.10* |
| Cyanide, mg/l | 0.05* | 0.05* |
| Cadmium, mg/l | 0.02* | 0.02* |
| Chromium, mg/l | 7.5 | 0.03* |
| Silver, Total, mg/l | 18.5 | 0.03* |
| Copper, Total, mg/l | 0.03* | 0.03* |
| Lead | 0.10* | 0.10* |
| Nickel, Total, mg/l | 0.10* | 0.10* |
| Zinc, Total, mg/l | 2.00 | 0.05* |
| Thiosulfates, mg/l | 11,200 | 1.00 |
| Sulfite, mg/l | 2500 | 10.0 |
| Iron, Total, mg/l | 4300 | 0.70* |
| Arsenic, mg/l | | 0.01* |
| Oil & Grease, mg/l | | 1.00 |
| Phenols, mg/l | | non-detected |
| Chloride, mg/l | | 2570 |

(*at or below the testing method's detection limits)

The unit operations required by my invention are described in detail in articles contained in UNIT OPERATION FOR TREATMENT OF HAZARDOUS INDUSTRIAL WASTE, 1978, Noyes Data Corporation, Park Ridge, New Jersey, Prepared for Publication by D. J. DeRenzo, containing sections on EVAPORATION, by Lawrence R. Woodland, pages 445-474; OZONATION, by Judith C. Harris, pages 767-797; and PHOTOLYSIS, by Judith C. Harris, pages 798-809. The combination of ozone and ultraviolet radiation is described in Prengle, et al., OXIDATION OF REFRACTORY MATERIALS BY OZONE WITH ULTRAVIOLET RADIATION, Second Annual Symposium on Ozone Technology, Montreal, Canada, May 11-14, 1975.

As modifications to the foregoing detailed description may be made without departing from the scope and spirit of my invention, what is desired to be protected by United States Letters Patent is set forth in the appended claims.

What is claimed is:

1. A method of treating liquid wastes from photographic processing comprising the steps of: mechanically filtering the liquid to remove solids therefrom; boiling the filtered liquid to create steam and vapor; subjecting the steam and vapor to ultraviolet light and to ozone; condensing said treated steam and vapor; and filtering the condensate.

2. The method of claim 1 further including the the step of electrolytically treating said filtered liquid before boiling to aid in the oxidation and conversion of various species of pollutants.

3. The method of treating the effluent from photographic processing comprising the steps of manually filling a resevoir with effluent to be treated, circulating the effluent through a filter to remove solids from the effluent, evaporating the treated effluent to produce steam and vapors therefrom and treating the steam and vapors with ultraviolet light and with ozone during said evaporation step, condensing the resultant steam and vapors and filtering the condensate with activated carbon.

4. The method of claim 3 wherein said ozone is also applied to said activated carbon to regenerate same for subsequent use.

5. A method for treating waste effluent from photographic processing comprising the steps of: filtering the waste effluent to remove solids therefrom; evaporating the filtered effluent to create resulting steam and vapors; oxidizing the steam and vapors by photolysis and photolytic catalyzed ozone; condensing the oxidized vapors; passing the condensate through the column of activated carbon; and regenerating the activated carbon by oxidizing the carbon sites with ozone.

* * * * *